(12) United States Patent
Muin et al.

(10) Patent No.: US 7,922,119 B2
(45) Date of Patent: Apr. 12, 2011

(54) TELESCOPIC STOWAGE BIN

(75) Inventors: Andrew Muin, Harsefeld (DE); Markus Schumacher, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 546 days.

(21) Appl. No.: 11/618,290

(22) Filed: Dec. 29, 2006

(65) Prior Publication Data

US 2007/0164155 A1   Jul. 19, 2007

Related U.S. Application Data

(60) Provisional application No. 60/829,693, filed on Oct. 17, 2006, provisional application No. 60/754,745, filed on Dec. 29, 2005.

(30) Foreign Application Priority Data

Dec. 29, 2005 (EP) .................................... 05028664
Oct. 17, 2006 (DE) .......................... 10 2006 048 998

(51) Int. Cl.
*B64D 11/00* (2006.01)
(52) U.S. Cl. .................................. 244/118.5; 244/118.1
(58) Field of Classification Search ............... 244/118.5, 244/118.1, 129.4; 312/246, 247; 52/67
See application file for complete search history.

(56) References Cited

U.S. PATENT DOCUMENTS

| | | |
|---|---|---|
| 628,605 A | 7/1899 | Ottenheimer |
| 1,378,210 A | 5/1921 | Berry |
| 1,829,486 A | 10/1931 | Kimbrig et al. |
| 3,142,461 A | 7/1964 | Naylor |
| 3,610,560 A | 10/1971 | Dillabough |
| 3,632,029 A | 1/1972 | Sonner |
| 3,817,434 A | 6/1974 | Dickman |
| 4,216,927 A | 8/1980 | Byrd |
| 4,624,502 A | 11/1986 | Boole |
| 5,015,033 A | 5/1991 | Winters |
| 5,083,727 A | 1/1992 | Pompei et al. |
| 5,573,288 A | 11/1996 | Raffensperger |
| 5,716,026 A | 2/1998 | Pascasio et al. |
| 5,772,370 A | 6/1998 | Moore |
| 5,816,650 A | 10/1998 | Lucas, Jr. |
| 5,820,076 A * | 10/1998 | Schumacher et al. ..... 244/118.5 |
| 5,820,210 A | 10/1998 | Shipman et al. |
| 5,829,836 A | 11/1998 | Schumacher et al. |
| 5,927,800 A | 7/1999 | Stallworth |

(Continued)

FOREIGN PATENT DOCUMENTS

DE   91 16 031 U1   4/1992

(Continued)

OTHER PUBLICATIONS

German Office Action dated Mar. 3, 2008 for application No. 10 2006 048 998.5-22, 4 pages.

(Continued)

*Primary Examiner* — Tien Dinh
*Assistant Examiner* — Richard R Green
(74) *Attorney, Agent, or Firm* — Christopher Paradies; Fowler White Boggs P.A.

(57) ABSTRACT

A stowage bin arrangement for fastening a stowage bin for an aircraft, includes a stowage bin unit with a first direction of extension. The stowage bin unit may be fastened to an aircraft structure and be designed such that the stowage bin unit is capable of being telescopically extended along the first direction of extension.

20 Claims, 6 Drawing Sheets

U.S. PATENT DOCUMENTS

| | | | |
|---|---|---|---|
| 6,053,570 A | | 4/2000 | Stern et al. |
| 6,082,816 A | | 7/2000 | Gottlieb et al. |
| 6,340,136 B1 | * | 1/2002 | Luria .................. 244/118.1 |
| 6,439,633 B2 | | 8/2002 | Nemoto |
| 6,615,421 B2 | * | 9/2003 | Itakura ................ 244/118.5 |
| 6,719,347 B2 | | 4/2004 | Gehring et al. |
| 6,883,753 B1 | * | 4/2005 | Scown ................. 244/118.1 |
| 6,921,129 B2 | | 7/2005 | Katz et al. |
| 7,201,421 B2 | | 4/2007 | Reynolds |
| 7,338,131 B2 | | 3/2008 | Forgatsch |
| 2001/0050499 A1 | | 12/2001 | DeLoach et al. |
| 2003/0222174 A1 | * | 12/2003 | Saint-Jalmes ......... 244/118.1 |
| 2004/0016847 A1 | | 1/2004 | Ritts |
| 2004/0066065 A1 | | 4/2004 | Forstner et al. |
| 2004/0245897 A1 | * | 12/2004 | Stephan et al. ............ 312/246 |
| 2006/0006704 A1 | | 1/2006 | Skelly et al. |

FOREIGN PATENT DOCUMENTS

| | | |
|---|---|---|
| DE | 4301681 C1 | 10/1994 |
| DE | 19502658 C1 | 3/1996 |
| DE | 296 06 532 U1 | 7/1996 |
| DE | 19534025 C1 | 11/1996 |
| DE | 19533981 C1 | 12/1996 |
| DE | 19534024 A1 | 3/1997 |
| DE | 10008258 A1 | 9/2001 |
| DE | 10052591 A1 | 9/2001 |
| DE | 10052593 A1 | 9/2001 |
| DE | 10052594 A1 | 9/2001 |
| DE | 10052595 A1 | 9/2001 |
| DE | 20120481 U1 | 6/2003 |
| DE | 102 24 048 A1 | 12/2003 |
| DE | 20 2004 008 069 U1 | 9/2004 |
| DE | 102004002169 A1 | 9/2005 |
| DE | 102004012480 A1 | 10/2005 |
| DE | 102004025125 A1 | 12/2005 |
| DE | 102004025982 A1 | 12/2005 |
| EP | 1279593 A2 | 1/2003 |
| EP | 1637451 A1 | 3/2006 |
| FR | 2755656 A1 | 5/1998 |
| SU | 1362300 A1 | 1/1986 |

OTHER PUBLICATIONS

The Office Action that issued on Aug. 25, 2009, in co-pending U.S. Appl. No. 11/618,303, 7 pages.

* cited by examiner

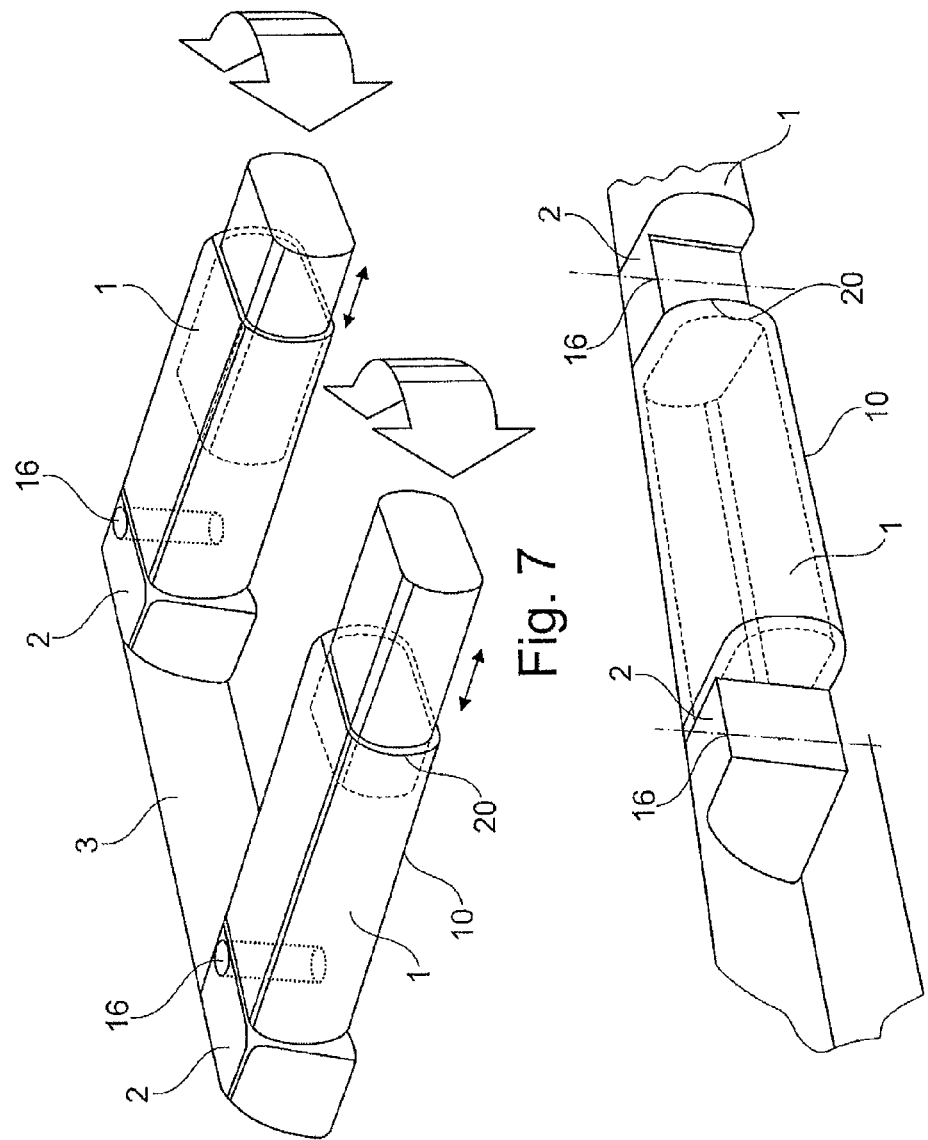

TELESCOPIC STOWAGE BIN

REFERENCE TO RELATED APPLICATION

This application claims the benefit of the filing date of German Patent Application No. 10 2006 048 998.5 filed Oct. 17, 2006, of U.S. Provisional Patent Application No. 60/829,693 filed Oct. 17, 2006, of European Patent Application No. 05 028 664.0 filed Dec. 29, 2005 and of U.S. Provisional Patent Application No. 60/754,745 filed Dec. 29, 2005, the disclosures of which applications are hereby incorporated herein by reference.

FIELD OF THE INVENTION

The field relates to a stowage bin arrangement for fastening a stowage bin for an aircraft, as well as to the use of a stowage bin arrangement for fastening a stowage bin for an aircraft, and to an aircraft comprising a stowage bin arrangement for fastening a stowage bin for an aircraft.

BACKGROUND TO THE INVENTION

In today's passenger aircraft the cabins are designed such that above the seats, stowage areas for hand luggage are provided. These overhead stowage compartments or hat racks extend in longitudinal direction of the fuselage above each seating area so that to the greatest extent possible, every passenger has close-proximity access to stowage space for their hand luggage. In this arrangement, the overhead stowage compartments may be designed as fixed bins, i.e. comprising a solid bottom and covers that hinge upward. In contrast to this, for safety reasons, heavy items of luggage are stowed on the cabin floor, underneath the seats, where the items are secured by retention rods on the seat chassis.

Other passenger-related components such as, for example, personal service units (PSUs), life jackets or ventilation devices are fastened to the overhead stowage compartments above the respective seats. In this arrangement these passenger supply units such as the PSUs with reading lights, loudspeakers, air supply nozzles and $O_2$ masks are fastened to the stowage bins.

When arranging the stowage bins in longitudinal direction of the aircraft, the passengers of all seat rows may access each stowage bin and may utilize the stowage space. Individual stowage volumes for passengers may only be provided underneath the respective aircraft seat.

In the case of stowage bins arranged in longitudinal direction of the aircraft, passengers may deposit their baggage from the aisle that may be located between the seats.

SUMMARY OF THE INVENTION

Among other things, it may be an object of the present invention to create a variable stowage bin.

This object may be met by a stowage bin arrangement for fastening a stowage bin for an aircraft, by the use of a stowage bin arrangement for fastening a stowage bin in an aircraft, and by an aircraft with a stowage bin arrangement for fastening a stowage bin according to the independent claims.

According to one embodiment of the invention, a stowage bin arrangement for fastening a stowage bin for an aircraft comprises a stowage bin unit with a first direction of extension. The stowage bin unit may be fastened to an aircraft structure and may be designed such that the stowage bin unit may be telescopically extended along the first direction of extension.

According to a further embodiment, the stowage device described above may be used in an aircraft.

According to a further embodiment, an aircraft with a stowage bin arrangement described above may be created.

In one embodiment, a stowage bin may be telescopically extended and retracted, with the size of the stowage bin thus being able to match the requirements of the cabin layout. In this way, it may allow for various requirements for stowage space, such that unused stowage space may be saved. For example, if the stowage bin arrangement may be arranged in an aircraft, the cabin layout of the aircraft cabin may comprise one times four seats, one times two seats or one times only one seat for each seat row. Depending on requirements, by the telescopically extendable stowage bin unit, the unit may be retracted and extended in the first direction of extension of the seat rows, for example, across the longitudinal direction of the aircraft, such that in each case, the telescopic stowage bin finishes off so as to be substantially perpendicular with the seat row. In this way, considerable space may be saved. Furthermore, the retractability of the stowage bin unit may create an improved feeling of space among passengers, which may result in enhanced cabin comfort. As a result of the flexible telescopic extension of the stowage bin unit, a change in the seat arrangement of the cabin may also be accomplished quickly, and the stowage bins may be adapted to the new cabin layout. In this way, the turnaround time or the time required for reconfiguring the cabin layout may be reduced.

According to a further embodiment, the stowage bin arrangement further comprises a frame device. The frame device may be fastened to the aircraft structure, wherein the stowage bin unit may be fastened to the frame device. By way of the frame device, the stowage bin unit may be attached to the aircraft structure, without itself establishing contact with the aircraft structure.

In this context the term "telescopic" may refer to the ability of a component to be retracted and extended so as to change its size. A telescopic embodiment may, for example, be implemented with a component comprising several parts, in which component the parts are of different diameters and may be slid one inside another.

The first direction of extension may thus describe the direction in which the stowage bin unit may be retracted and extended, and may thus be changed in size. For example, in a stowage bin in an aircraft, the direction of extension may refer to the direction that extends in a horizontal plane across the longitudinal direction of the aircraft, i.e. for example the direction of flight or the direction of extension of the fuselage.

According to a further embodiment, the frame device may be designed so as to be telescopic, wherein the frame device in the first direction of extension may be telescopically extended. The frame device may be extended and retracted in the same first direction of extension as the stowage bin unit so that when the stowage bin unit may be retracted, the frame device does not remain in the cabin space but instead may be also telescopically retractable. In this way, the frame device may be designed so as to be positive-locking with an extended state of the stowage bin unit.

According to a further embodiment, the frame device comprises a first frame element with a first end and a second end, wherein the first frame element extends along the first direction of extension. The first end may be fastenable to the aircraft structure. By the design of the frame device with a frame element, the frame element extends along the first direction of extension, the stowage bin unit may be fastenable to the aircraft structure by this frame element alone. The first frame element may serve the function of a support beam that extends, for example, underneath the stowage bin device. Since this requires no additional support devices, material may be saved in this way.

According to a further embodiment, the frame device comprises a second frame element with a third end and a fourth end. The second frame element comprises a second direction of extension. The third end of the second frame element may be fastened to the second end of the first frame element. The fourth end of the second frame element may be fastened to the aircraft structure, wherein the first direction of extension differs from the second direction of extension. In order to obtain greater static and dynamic stability of the frame device for mounting the stowage bin unit, the frame device may be attached to the aircraft structure by two points. Since the first direction of extension differs from the second direction of extension, the first and the second frame elements also comprise different fastening points on the aircraft structure so that a statically more stable stowage bin arrangement may be obtained.

The second direction of extension may differ from the first direction of extension. In this way the frame structure with the first and the second frame elements may, for example, enclose the stowage bin unit on two sides. In an aircraft, the second direction of extension may, for example, extend in a vertical plane, for example, along the z-axis of an aircraft axis coordinate system.

According to a further embodiment, the first direction of extension and the second direction of extension are aligned so as to be orthogonal in relation to each other. In this alignment of the first direction of extension and the second direction of extension so that they are orthogonal in relation to each other the greatest static stability may be achieved because in this way the best-possible moments and forces may be transferred to the structure. Apart from an orthogonal alignment, furthermore, the first direction of extension and the second direction of extension may comprise an angular range of 80-100°, an angular range of 70-120° or an angular range of 50-150°.

According to a further embodiment, the second frame element may be telescopically extended along the second direction of extension. The stowage bin arrangement may thus adjust the position of the stowage bin unit in a first direction of extension and in a second direction of extension. The flexibility of the stowage bin arrangement may thus be enhanced. Furthermore, the stowage bin arrangement with the first frame element and the second frame element may be arranged on a curved or circular fastening surface so that when the first frame element telescopically extends along the first direction of extension, the second frame element may also telescopically extend along the second direction of extension, wherein the first frame element and the second frame element may remain in contact with the aircraft structure.

According to a further embodiment, the second frame element may be connected to the aircraft structure such that the second frame element may be slid along the first direction of extension. Thus in the case of telescopic enlargement of the stowage bin along the first direction of extension, the second frame element may be slid along and may be matched to the new frame structure. Despite the flexible change in size of the stowage bin unit, a stable static interconnection with the first frame element and the second frame element may nevertheless be maintained.

According to a further embodiment, the first frame element and the second frame element are of an integral design. In this way, a stable support with two directions of extension may be made, wherein increased stability may be achieved due to the improved static interconnection. There may be no need to use connection means between the first extension element and the second extension element so that, furthermore, savings in material and weight may be achieved.

According to a further embodiment, the frame device further comprises a passenger supply unit. A passenger supply unit may, for example, comprise passenger-related components such as PSUs, reading lights, loudspeakers, air supply nozzles, $O_2$ masks or any other units provided for passengers. Furthermore, the frame device may be of a telescopic design, the passenger supply unit may be flexibly adapted to the respective seat position of a passenger seat so that passengers may find, for example, all the passenger supply units vertically above their seat position, i.e. in close proximity. In this way it may be possible to do without complicated and time-consuming reconfiguration processes relating to the passenger supply units, so that faster cabin layout reconfiguration may be implemented.

According to a further embodiment, the frame device may be attached such that the frame device may be slid along a third direction of extension. In this arrangement, the third direction of extension differs from the first direction of extension and from the second direction of extension. The third direction of extension may extend in a horizontal plane, i.e. for example along a longitudinal axis of the aircraft. This creates the option of sliding the frame device including the stowage bin unit in an additional, third, direction of extension so that the stowage bin unit may be flexibly adapted to or displaced in three directions of extension. This may enhance the flexibility of the stowage bin arrangement.

According to a further embodiment, the stowage bin unit may be connected to the frame device such that the stowage bin unit may be slidable, relative to the frame device, along the third direction of extension. The stowage bin unit may thus, for example, be fine-adjusted in that the frame remains fastened to the aircraft structure while the stowage bin unit may nevertheless be slid along the third direction of extension. For example, a passenger may thus push the stowage bin unit into a position that may be convenient, so that the passenger may easily reach the stowage bin unit. This may thus enhance passenger convenience.

According to a further embodiment, the stowage bin unit comprises an interior space and an opening. In this arrangement the opening may be designed such that the interior space may be accessible. In this arrangement, the opening may be located along the third direction of extension. If the accessibility of seat elements of an aircraft may be also in the third direction of extension then the passenger may reach the stowage bin unit directly above the seat. For example in an aircraft cabin, it may thus be possible to implement a transverse bin, wherein access may be provided along the longitudinal axis of the aircraft or the third direction of extension. The passenger may thus during the procedure of loading and unloading the transverse bin free up a main aisle such that no blockages of the main aisle may occur.

According to a further embodiment, the stowage bin unit comprises an inner stowage bin element and an outer stowage bin element. The inner stowage bin element and the outer stowage bin element are designed so as to be telescopic, wherein the inner stowage bin element can be slid into the outer stowage bin element. The stowage bin unit may thus be designed so as to be telescopic by two independent stowage bin elements. By two or several stowage bin elements, whose interior space may be separate from each other, furthermore, an individual stowage bin for each passenger may be created, as a result of which passenger comfort in the cabin may be enhanced.

According to a further embodiment, in a retracted state, the inner stowage bin element may be slid into the outer stowage bin element. In an extended state, the inner stowage bin element may be extended from the outer stowage bin element. In the first state and in the second state, the interior space may be accessible. Thus in any retracted or extended position of the stowage bin unit, access to the interior space may be provided by the opening. If, for example, the openings of the inner stowage bin element and of the outer stowage bin element are positioned one above the other in the slid-in state, then access may still be possible even in the retracted state. The functionality of the stowage bin unit may not be restricted despite its flexibility.

According to a further embodiment, the frame device comprises a rotary axis. The rotary axis extends along the second direction of extension. The stowage bin unit may be designed so as to be swivellable on the rotary axis. With the embodiment the stowage bin unit may furthermore be swivelled so that additional space may be saved. In one state, the stowage bin unit may rest against a cabin wall, while in another extended state it may project into the interior of the cabin. Depending on requirements, the stowage bin unit may thus be adapted.

According to a further embodiment, the frame device comprises a third frame element and a fourth frame element. In this arrangement, the third frame element comprises the first direction of extension, and the fourth frame element comprises the second direction of extension. In this arrangement the first frame element, the second frame element, the third frame element and the fourth frame element enclose the stowage bin unit. The supporting frame elements may thus be designed so as to enclose the entire stowage bin unit so that a statically and dynamically stable frame interconnection may be created.

According to a further embodiment, the third frame element and the fourth frame element are telescopically extendable. This may create the option of implementing the ability to flexibly extend and retract the stowage bin unit even by the enclosing frame, so that good flexibility may maintained.

According to a further embodiment, the first frame element, the second frame element, the third frame element and the fourth frame element are of an integral design. The stability of the enclosing frame may thus be improved.

The aircraft structure may, for example, be a supporting structure of an aircraft, or a supporting structure of some other transport, such as, for example, a rail vehicle, road vehicle or water craft.

According to a further embodiment of the aircraft, the aircraft comprises a longitudinal direction. The first direction of extension extends at a right angle in relation to the longitudinal direction of the aircraft, in a horizontal aircraft plane. The second direction of extension extends at a substantially right angle in relation to the first direction of extension and in relation to the flight axis. The third direction of extension extends substantially parallel in relation to the longitudinal direction of the aircraft. The longitudinal direction of an aircraft extends in the direction of the direction of extension of the aircraft fuselage. In expert terminology, often an aircraft axis coordinate system may be defined, wherein the x-axis extends along the longitudinal direction of the aircraft, for example from the rear of the aircraft to the front tip of the aircraft. The y-axis may extend at a right angle in relation to the x-axis in a horizontal aircraft plane, for example in the direction of extension of the aircraft wings. In this arrangement the z-axis may be at a right angle to the x-axis and to the y-axis of the aircraft axis coordinate system thus extending, for example, along a vertical aircraft plane.

In other words the first direction of extension may thus extend along a y-axis of the aircraft axis coordinate system. The second direction of extension may extend along the z-axis of the aircraft axis coordinate system. The third direction of extension may extend along the longitudinal direction of the aircraft or the x-axis of the aircraft axis coordinate system.

The embodiments of the stowage bin arrangement also relate to the use as well to the aircraft, and vice versa.

BRIEF DESCRIPTION OF THE DRAWINGS

Below, for further explanation and to provide a better understanding of the present invention, embodiments are described in more detail with reference to the enclosed drawings. The following are shown:

FIG. 7 depicts a diagrammatic view of a stowage bin unit which may be designed according to an embodiment so as to be swivellable;

FIG. 8 shows a diagrammatic view of a swivellable stowage bin unit in the swivelled-in state, according to an embodiment of the invention.

DETAILED DESCRIPTION

Figure 1:
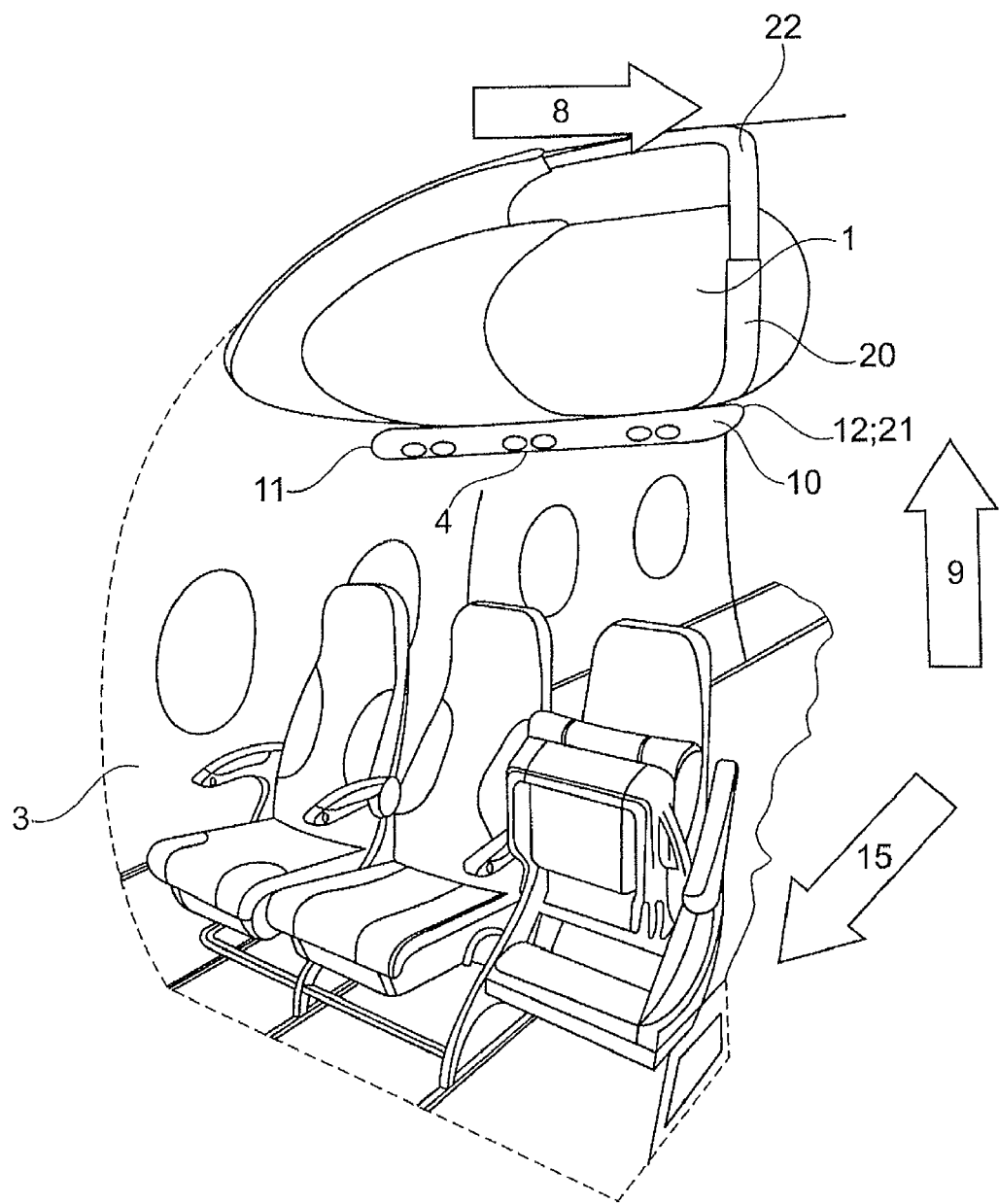
FIG. 1 shows a diagrammatic view of an embodiment of the telescopic stowage bin arrangement.

The examples described and drawings rendered are illustrative and are not to be read as limiting the scope of the invention as it may be defined by the appended claims.

Identical or similar components in different figures have the same reference characters. The illustrations in the figures are diagrammatic and not to scale.

FIG. 1 shows an embodiment of the invention. A stowage bin unit 1 comprising a first direction of extension 8 may be fastened to an aircraft structure 3. The stowage bin unit 1 may be designed such that the stowage bin unit 1 may be telescopically extended along the first direction of extension 8. Thus, depending on the requirements for stowage space, a certain size of the stowage bin unit 1 may be provided. If in FIG. 1, only two seats were arranged side-by-side, the stowage bin unit 1 may be telescopically retracted and could finish off so as to be vertical in relation to the second, aisle-side, seat element.

Furthermore, the stowage bin arrangement, as shown in FIG. 1, comprises a first frame element 10 and a second frame element 20, which on their second end 12 and third end 21 are connected to each other, and on their first end 11 and fourth end 22 may be attached to the aircraft structure 3. The first frame element 10 extends in the first direction of extension 8, while the second frame element 20 extends in the second direction of extension 9. The first frame element 10 and the second frame element 20 form an L-support; they may thus support the stowage bin unit 1 with a static stable interconnection.

Furthermore, the first frame element 10 and the second frame element 20 may be telescopically extended so that the frame elements 10, 20 may adapt to the size of the stowage bin unit 1.

Figure 2:
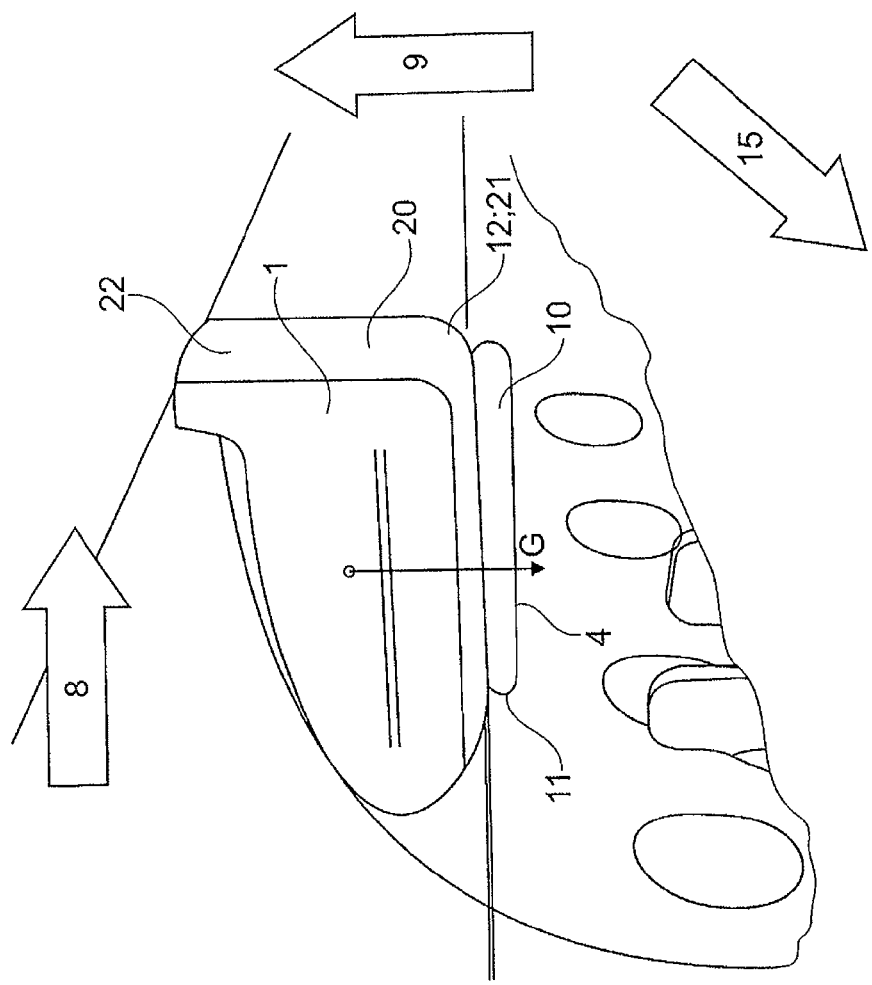
FIG. 2 illustrates a diagrammatic view of an embodiment of the telescopic stowage bin arrangement and of two frame elements.

FIG. 2 shows a further view of the stowage bin unit 1. The first frame element 10 and the second frame element 20 are of an integral design and form an L-shaped support. By their first end 11 and their second end 22, the first frame element 10 and the second frame element 20 are fastened to the aircraft structure 3. On the first frame element 10, passenger supply units 4 may be arranged in close proximity to passengers. The passenger supply unit 4 may be flexibly displaced corresponding to the telescopic displacement of the first frame element 10. This ensures that the passenger supply unit 4, for example a loudspeaker, a warning light or an oxygen supply device, may always be arranged in close proximity above the passenger, whatever the particular cabin layout.

Furthermore, FIG. 2 shows the center of gravity G of the stowage bin unit 1. In this arrangement, the fastening points of the first end 11 of the first frame element 10 and of the fourth end 22 of the second frame element 20 may be arranged on the aircraft structure 3 such that an imaginary connection line extends through the center of gravity G. In this way, improved static and dynamic stability may be achieved because any forces and moments acting on the structure may be better absorbed due to the improved lever effect. By this arrangement of the stowage bin unit 1, acceleration forces of up to 16 g and more along the third direction of extension 15 may be absorbed. Due to the improved static suspension, for example, two fastening points may be adequate for coping with deceleration forces of up to 16 g.

Figure 3:
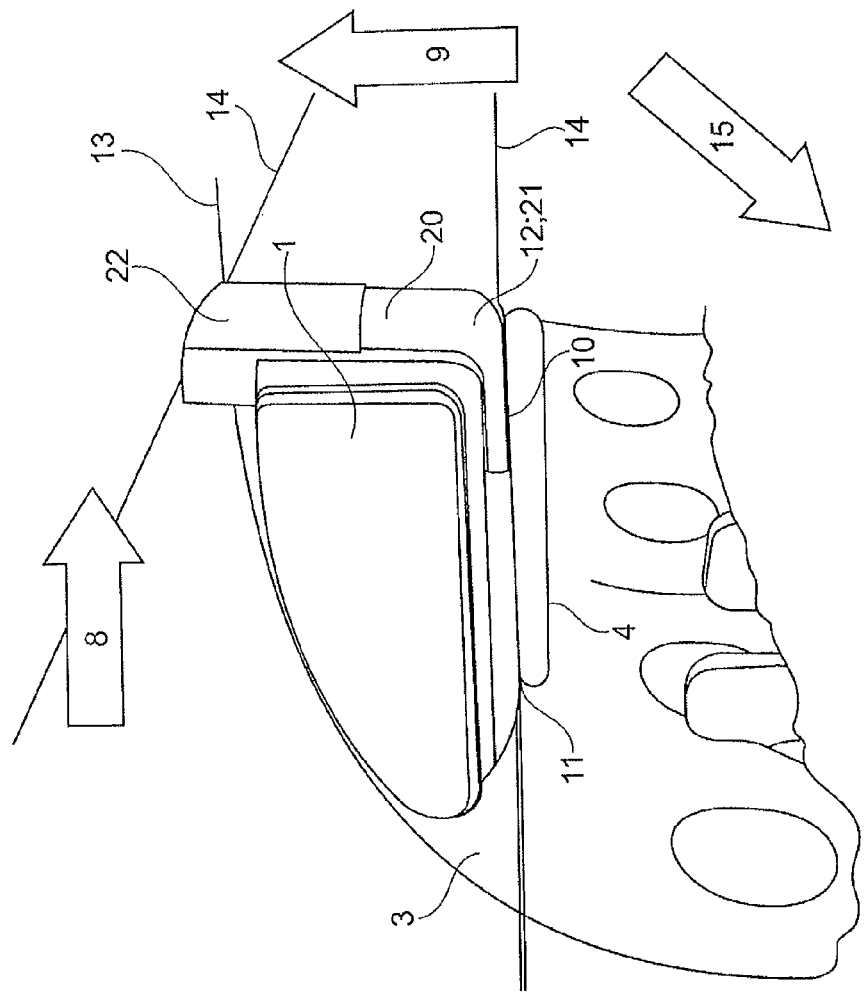
FIG. 3 depicts a diagrammatic view of the stowage bin arrangement in which the stowage bin unit according to one embodiment may be designed so as to be capable of sliding in a third direction of extension.

FIG. 3 shows an embodiment in which the stowage bin unit 1 may be arranged so that it may be displaced relative to the first and the second frame elements. The stowage bin unit 1 may, for example, be designed so as to be displaceable along the third direction of extension 15. Thus, fine-adjusting the stowage bin unit 1 may be allowed.

FIG. 3 further shows a first rail element 13 and a second rail element 14. In this arrangement, the first rail element 13 extends along a cabin structure in circumferential direction. The fourth end 22 of the second frame element 20 may, for example, be in engagement with the first rail element 13. Thus, by the first rail element 13, the second frame element 20 may be slidable along the first direction 8 of extension.

The second rail element 14 may extend along the aircraft structure 3 in the direction of the third direction of extension 15. The first end 11 of the first frame element 10, and the fourth end 22 of the second frame element 20 may engage the first rail element 13. Thus, the entire stowage bin arrangement may be slidably arranged along the third direction of extension, i.e., along a longitudinal axis of the aircraft. In this way changes in the layout of the cabin may speedily be implemented, above all because all the required passenger supply units 4 may be slid along with the stowage bin arrangement.

Figure 4:
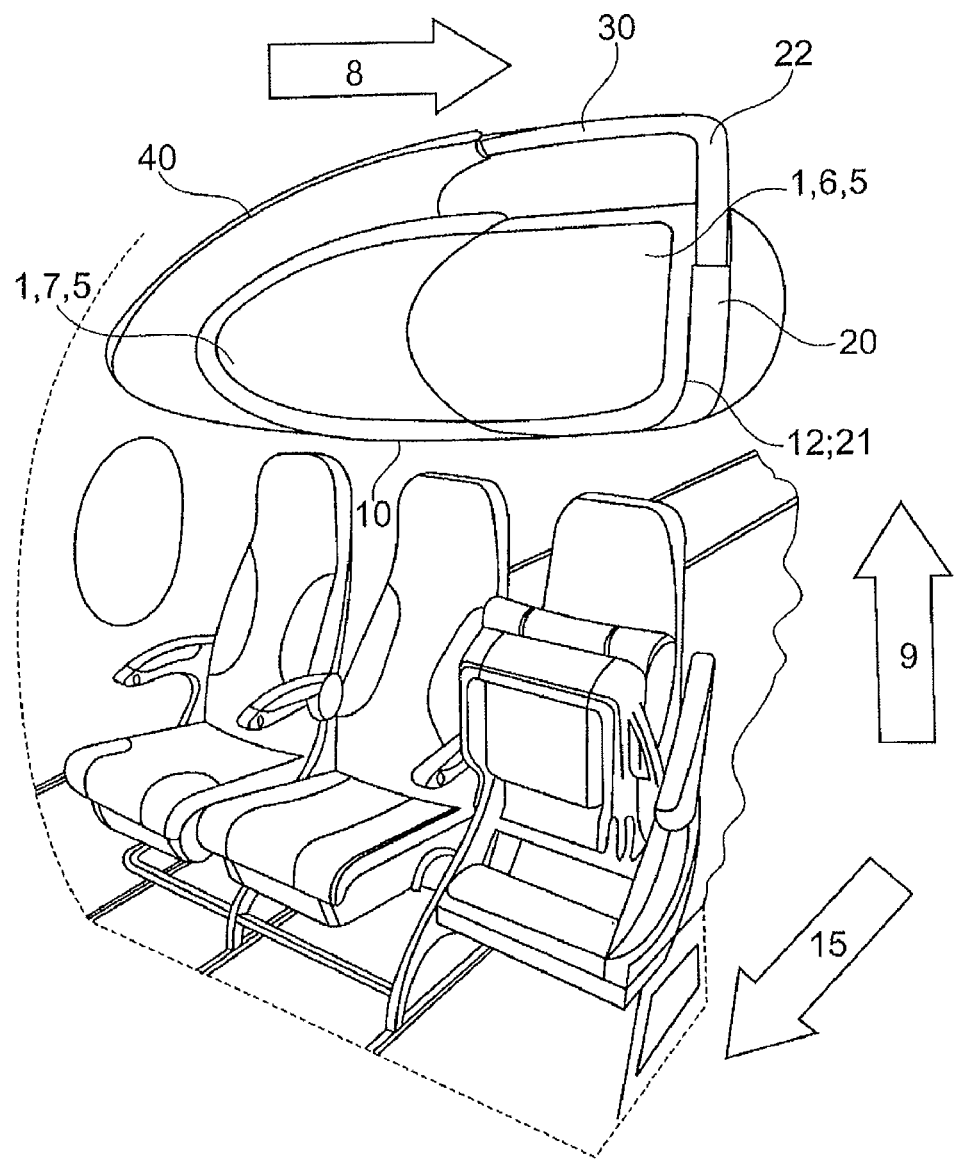
FIG. 4 shows a diagrammatic view of a stowage bin arrangement with enclosing frame elements according to an embodiment.

FIG. 4 shows a stowage bin arrangement with an enclosing frame device. The frame device comprises a first frame element 10, a second frame element 20, a third frame element 30 and a fourth frame element 40. The frame elements 10, 20, 30, 40 integrally form an enclosing frame. The first frame structure 10 and the third frame structure 30 are provided so that they may be telescopically extended such that the stowage bin arrangement 1 may be slid along the first direction of extension 8.

Furthermore, the stowage bin unit 1 may be designed in two parts, with an inner stowage bin element 6 and an outer stowage bin element 7. In this arrangement, the inner stowage bin element 6 may be retracted into the outer stowage bin element 7 such that the stowage bin unit 1 may be telescopically extended. In this arrangement, the inner stowage bin element 6 and the outer stowage bin element 7 comprise openings 5. If the stowage bin elements 6, 7 are in their retracted state, then the openings 5 may be one above the other in a substantially congruent manner so that despite an overlap of the inner stowage bin element 6 and the outer stowage bin element 7, access to the interior space may be provided.

Figure 5:
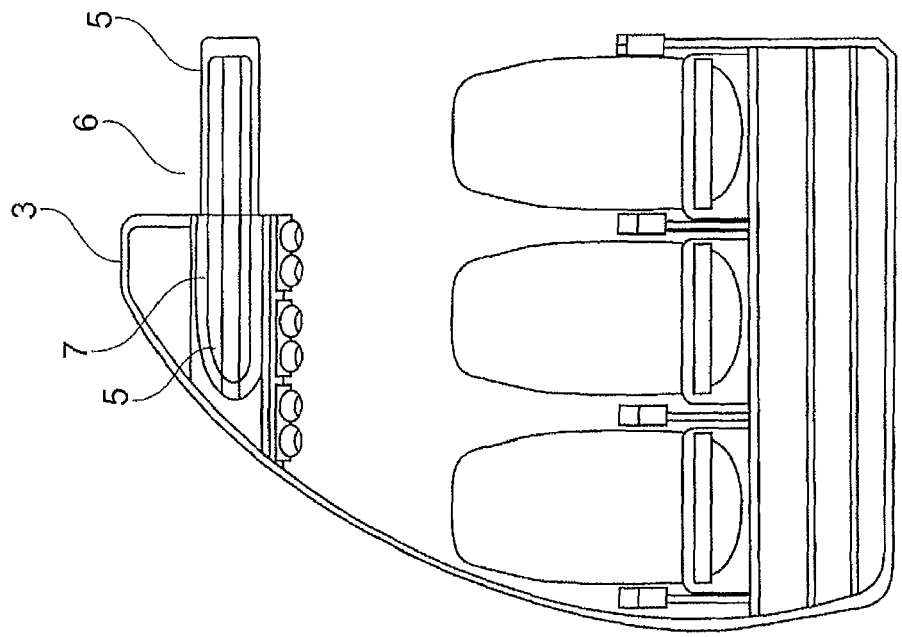
FIGS. 5, 6 illustrate a diagrammatic view of a stowage bin in the retracted and extended state according to an embodiment.
Figure 6:
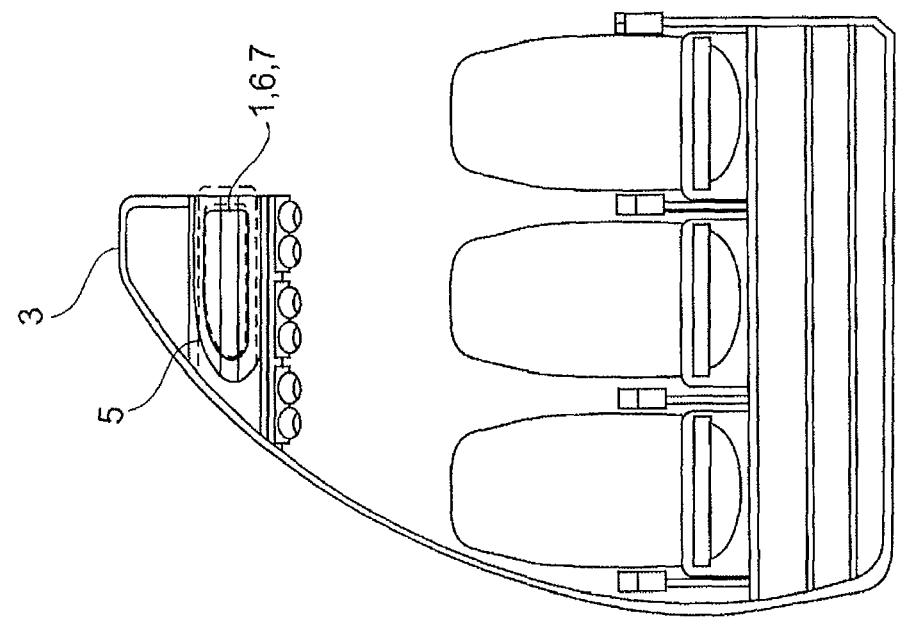

FIGS. 5 and 6 show a telescopic stowage bin unit in a retracted and an extended state. In the embodiment shown, the aircraft structure 3 comprises a support frame in which the stowage bin arrangement and the seat elements are held. The support frame holds the non-slidable part or the outer stowage bin element 7 of the stowage bin arrangement. The frame forms an inverted "U" shape whose ends may comprise fastening points of the stowage bin arrangement. In this way additional stability of the stowage bin arrangement may be achieved.

FIGS. 7 and 8 show a swivel mechanism of the stowage bin unit 1. The stowage bin unit 1 may be swivellably held to the frame device 2 on a rotary axis 16. In this arrangement the rotary axis 16 extends, for example, in the second direction of extension, for example along the z-axis of an aircraft axis coordinate system. In one example, a telescopically expandable overhead stowage bin arrangement comprises an overhead stowage bin unit with elements slidably extendable and retractable, telescopically, in a first direction and a frame device comprising a rotary axis, in a second direction, such that the stowage bin is capable of swivelling about the rotary axis.

FIG. 7 shows the stowage bin unit 1 in its extended state. If the stowage bin unit 1 is not used, it may be swivelled on the rotary axis 16 to a retracted state so that it does not unnecessarily take up space, as shown in FIG. 8. The stowage bin unit 1 may thus be swivelled out for loading, and subsequently may be swivelled in. Passengers may thus step between the seat rows and operate the stowage bin unit 1. During flight, the stowage bin units 1 are in their swivelled-in state such that cabin space is not unnecessarily taken up and so that no visual barrier that would be aesthetically displeasing remains in the cabin.

In addition, it should be pointed out that "comprising" does not exclude other elements ments or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

Alternative combinations and variations of the examples provided will become apparent on this disclosure. It is not possible to provide specific examples for all of the many possible combinations and variations of the embodiments described, but such combinations and variations may be claims that eventually issue.

LIST OF REFERENCE CHARACTERS

1 Stowage bin unit
2 Frame device
3 Aircraft structure
4 Passenger supply unit

5 Opening
6 Inner stowage bin element
7 Outer stowage bin element
8 First direction of extension
9 Second direction of extension
10 First frame element
11 First end
12 Second end
13 First rail element
14 Second rail element
15 Third direction of extension
16 Rotary axis
20 Second frame element
21 Third end
22 Fourth end
30 Third frame element
40 Fourth frame element
G Center of gravity of the stowage bin unit

What is claimed is:

1. A telescopically expandable overhead stowage bin arrangement for fastening in an aircraft comprising:
an overhead stowage bin unit coupled to the aircraft above the seating area, the overhead stowage bin unit comprising an inner stowage bin element and an outer stowage bin element, the inner stowage bin element fitting telescopically within the outer stowage bin element such that the inner stowage bin element and the outer stowage bin element of the overhead stowage bin unit are slidably extendable in relation to each other, telescopically, along a longitudinal first direction of extension of the stowage bin unit and slidably retractable in an opposite direction from the first direction of extension, such that the overhead stowage bin unit has a first stowage volume in the overhead stowage bin unit for stowage of articles, when the overhead stowage bin unit is closed during flight of the aircraft in a telescopically retracted arrangement and a second stowage volume for stowage of articles in the overhead stowage bin, when the overhead stowage bin unit is closed during flight of the aircraft and in a telescopically extended arrangement, the second stowage volume being greater than the first stowage volume.

2. The overhead stowage bin arrangement of claim 1, further comprising:
a frame device;
wherein the frame device is capable of being fastened to the aircraft structure;
and the overhead stowage bin unit is capable of being fastened to the frame device.

3. The overhead stowage bin arrangement of claim 2;
wherein the frame device is telescopically extendable as the overhead stowage bin unit is telescopically extended to the telescopically extended arrangement.

4. The overhead stowage bin arrangement of claim 2;
wherein the frame device comprises a first frame element with a first end and a second end;
the first frame element extending along the first direction of extension and the first end is fastened to the aircraft structure when the overhead stowage bin arrangement is fastened.

5. The overhead stowage bin arrangement of claim 4;
wherein the frame device comprises a second frame element having a third end and a fourth end opposite of the third end;
the second frame element providing a second direction of extension for the overhead stowage bin arrangement;
the third end of the second frame element is fastened to the second end of the first frame element, when the overhead stowage bin arrangement is mounted in the aircraft;
the fourth end of the second frame element is fastened to the aircraft structure, when the overhead stowage bin arrangement is mounted in the aircraft; and
the first direction of extension differs from the second direction of extension.

6. The overhead stowage bin arrangement of claim 5;
wherein the first direction of extension and the second direction of extension are aligned so as to be substantially orthogonal in relation to each other.

7. The overhead stowage bin arrangement of claim 5;
wherein the second frame element is telescopically extendable along the second direction of extension.

8. The overhead stowage bin arrangement of claim 5;
wherein the second frame element is connected to the aircraft structure such that the second frame element is slidable along the first frame element.

9. The overhead stowage bin arrangement of claim 5;
wherein the first frame element and the second frame element are of an integral design.

10. The overhead stowage bin arrangement of claim 5;
wherein the frame device comprises a third frame element and a fourth frame element;
the third frame element extending along the first direction of extension;
the fourth frame element extending along the second direction of extension; and
the first frame element, the second frame element, the third frame element and the fourth frame element enclose the overhead stowage bin unit.

11. The overhead stowage bin arrangement of claim 10;
wherein the third frame element and the fourth frame element are telescopically extendable.

12. The overhead stowage bin arrangement of claim 10;
wherein the first frame element, the second frame element, the third frame element and the fourth frame element are of an integral design.

13. An aircraft comprising a stowage bin arrangement of claim 5;
wherein a fuselage of the aircraft has a longitudinal axis that extends along a longitudinal direction;
the first direction of extension extends substantially transversely in relation to the longitudinal direction of the aircraft, in a horizontal aircraft plane;
the second direction of extension extends substantially transversely to the first direction of extension and in relation to the longitudinal direction; and
the third direction of extension extending substantially parallel to the longitudinal direction.

14. The overhead stowage bin arrangement of claim 2;
wherein the frame device comprises a passenger supply unit.

15. The overhead stowage bin arrangement of claim 14, wherein the passenger supply unit of the overhead storage bin unit comprises reading lights, loudspeakers, air supply nozzles, oxygen masks, or a combination of these.

16. The overhead stowage bin arrangement of claim 15, wherein the passenger supply unit of the overhead storage bin unit comprises a combination of more than one of the group consisting of reading lights, loudspeakers, air supply nozzles and oxygen masks.

17. The overhead stowage bin arrangement of claim 16, wherein the passenger supply unit of the overhead storage bin unit comprises reading lights, loudspeakers, air supply nozzles and oxygen masks.

18. The overhead stowage bin arrangement of claim 2; wherein the frame device comprises a rotary axis, the rotary axis of the frame device extending along a second direction, and the stowage bin unit is designed such that the overhead stowage bin unit swivels about the rotary axis, when the overhead stowage bin unit is rotated about the second direction.

19. The overhead stowage bin arrangement of claim 1: wherein the overhead stowage bin unit comprises an interior space and an opening, the opening is designed such that the interior space is accessible in a third direction of extension.

20. An aircraft comprising an overhead stowage bin arrangement of claim 1.

* * * * *